United States Patent
Ko et al.

(10) Patent No.: US 8,513,475 B2
(45) Date of Patent: Aug. 20, 2013

(54) METHOD FOR MAKING HYDROCARBONS BY USING A LIPID DERIVED FROM A BIOLOGICAL ORGANISM AND HYDROTALCITE

(75) Inventors: Chang-Hyun Ko, Daejeon (KR); Jeong-Geol Na, Daejeon (KR); Jong-Nam Kim, Daejeon (KR); Kwang-Bok Yi, Daejeon (KR); Sung-Youl Park, Daejeon (KR); Jong-Ho Park, Daejeon (KR); Hee-Tae Beum, Daejeon (KR); Bo-Eun Yi, Jeonbuk (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/510,403

(22) PCT Filed: Nov. 17, 2010

(86) PCT No.: PCT/KR2010/008121
§ 371 (c)(1),
(2), (4) Date: May 17, 2012

(87) PCT Pub. No.: WO2011/062410
PCT Pub. Date: May 26, 2011

(65) Prior Publication Data
US 2012/0253091 A1    Oct. 4, 2012

(30) Foreign Application Priority Data

Nov. 17, 2009  (KR) .................. 10-2009-0110898

(51) Int. Cl.
*C10G 1/10* (2006.01)
(52) U.S. Cl.
USPC .................... 585/240; 585/241; 585/242
(58) Field of Classification Search
None
See application file for complete search history.

(56) References Cited

U.S. PATENT DOCUMENTS

| 5,191,123 A | 3/1993 | King |
| 7,781,619 B2 * | 8/2010 | Brevoord et al. ............ 568/354 |
| 2007/0244343 A1 | 10/2007 | Brevoord Eelko et al. |
| 2012/0203040 A1 * | 8/2012 | Ratnasamy .................... 585/16 |

FOREIGN PATENT DOCUMENTS

| WO | 2006-014486 | 2/2006 |
| WO | 2007-128798 | 11/2007 |
| WO | 2009-071495 | 6/2009 |

OTHER PUBLICATIONS

Simakova et al., "Deoxygenation of palmitic and stearic acid over supported Pd catalysts: Effect of metal dispersion", Applied Catalysis A: General 355, (100-108), 2009.
Kubickova et al., "Hydrocarbons for diesel fuel via decarboxylation of vegetable oils", Catalysis Today 106, 197-200, 2005.
Huber et al., "Processing biomass in conventional oil refineries: Production of high quality diesel by hydrotreating vegetable oils in heavy vacuum oil mixtures", Applied Catalysis A: General 329, 120-129, 2007.
International Search Report for corresponding patent application No. PCT/KR2010/008121 dated Jul. 29, 2011.

* cited by examiner

*Primary Examiner* — Tam N Nguyen
(74) *Attorney, Agent, or Firm* — Renner, Otto, Boisselle & Sklar, LLP

(57) ABSTRACT

The present invention relates to a method in which a catalytic reaction is used in order to produce hydrocarbons from renewable starting material derived from biological organisms such as vegetable lipids, animal lipids, and lipids extracted from macroalgae and microalgae, and more specifically relates to a method for selectively making a hydrocarbon, which is suitable for making gasoline or diesel, by removing the oxygen contained in the starting material without consuming hydrogen. In the present invention, the production takes place by bringing the starting material into contact with hydrotalcite, which constitutes a catalyst, thereby removing oxygen via a decarboxylation or decarbonylation reaction; and the starting material is one or more such material selected from triglycerides, fatty acids, and fatty acid derivatives obtained from a renewable source of supply originating from a biological organism.

4 Claims, 3 Drawing Sheets

METHOD FOR MAKING HYDROCARBONS BY USING A LIPID DERIVED FROM A BIOLOGICAL ORGANISM AND HYDROTALCITE

TECHNICAL FIELD

The present invention relates to a method of producing hydrocarbons from renewable raw materials derived from biological organisms, such as vegetable lipids, animal lipids, lipids extracted from macroalgae and microalgae, and the like, using a catalytic reaction, and, more particularly, to a method of selectively producing hydrocarbons, which are suitable for making gasoline or diesel oil, by removing the oxygen contained in the raw material without consuming hydrogen.

BACKGROUND ART

With the increase of concerns about insufficient crude oil and climate change attributable to carbon dioxide emission, attempts to use renewable energy sources have been increasingly made. Particularly, the production of a fuel for transportation using biomass, which is a renewable energy source obtained from biological organisms, has attracted considerable attention.

Biodiesel is a typical fuel used for producing power for transportation. Biodiesel is produced in the form of a fatty acid methyl ester ($R_1$—COO—$R_2$, $R_1$: an alkyl group of fatty acid, $R_2$: a methyl group) by the transesterification reaction of a triglyceride and methanol as raw materials. Most triglycerides are vegetable oils obtained from beans, rapeseed, sunflower seeds, and the like.

When the biodiesel produced in this way is used as a fuel, the biodiesel is helpful to the reduction of carbon dioxide emissions because it is carbon-neutral. However, the biodiesel is problematic in that it is difficult to use in a low-temperature climate region because it has low fluidity at a low temperature, and in that it corrodes an internal combustion engine and is difficult to store for a long time.

In order to solve such problems of biodiesel, hydrodeoxygenation (HDO) has been researched. According to a document (reference: G. W. Huber et al., Applied Catalysis A: General 329 (2007) 120-129), the hydrodeoxygenation of biodiesel was tested based on a hydrodesulfurization catalyst and a hydrodesulfurization apparatus, and, as a result, oxygen included in a triglyceride (raw material) was removed in the form of water ($H_2O$), carbon dioxide ($CO_2$) or carbon monoxide (CO), thus producing hydrocarbons. However, considering the reaction conditions mentioned in this document, it is determined that high process pressure is required and a large amount of hydrogen is used, so it is predicted that operation costs and equipment costs will be increased.

In order to solve the above problem, recently, patents of Neste Oil Company (EP 1681337, KR 10-2007-0094913(A)) and several theses (I. Kubickova et al., Catalysis Today 106 (2005) 197-200, and I. Simakova et al., Applied Catalysis A: General 355 (2009) 100-108) have disclosed methods of removing oxygen from a triglyceride in the form of carbon dioxide or carbon monoxide using active carbon supported with palladium or platinum, and simultaneously reducing the consumption of hydrogen compared to the consumption of hydrogen in the hydrodesulfurization process. However, the methods disclosed in the above patents and theses are also problematic in that, although the consumption of hydrogen is greatly reduced, operation costs and equipment costs are also high because hydrogen is still used.

That is, there is a problem in that, when a conventional catalyst supported with a noble metal is used, oxygen is removed from the triglyceride at relatively low temperature in the form of carbon dioxide or carbon monoxide by a decarboxylation or decarbonylation reaction, but the catalyst is expensive, and hydrogen must be used in order to stabilize the catalyst.

DISCLOSURE

Technical Problem

Accordingly, the present invention has been made to solve the above-mentioned problems of hydrogen and a noble metal catalyst being used in the process of converting an energy source obtained from biological organisms, such as triglycerides, into hydrocarbons, and an object of the present invention is to provide a method of producing hydrocarbons wherein hydrocarbons are produced using hydrotalcite, which is cheaper than a catalyst supported with a noble metal, as a catalyst without consuming hydrogen, thus reducing operation costs and equipment costs.

Technical Solution

In order to accomplish the above object, an aspect of the present invention provides a method of producing hydrocarbons using lipids derived from biological organisms and hydrotalcite, including the step of: bringing a raw material into contact with hydrotalcite as a catalyst to remove oxygen from the raw material by a decarboxylation or decarbonylation reaction, wherein the raw material is one or more selected from triglycerides, fatty acids, and fatty acid derivatives, which are obtained from renewable raw material sources derived from biological organisms.

Further, the step of bringing the raw material into contact with the catalyst may be carried out at a temperature of 200~450° C. and a pressure of 0.1~15 MPa.

Further, the decarboxylation or decarbonylation reaction may proceed in a liquid phase.

Further, the hydrotalcite may be a preheated hydrotalcite, obtained by pretreating hydrotalcite represented by Chemical Formula I below:

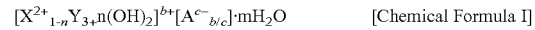
[Chemical Formula I]

$$[X^{2+}_{1-n}Y_{3+n}(OH)_2]^{b+}[A^{c-}_{b/c}]\cdot mH_2O$$

wherein X is a monovalent or divalent metal cation selected from the group consisting of magnesium, calcium, zinc, manganese, nickel, cobalt, strontium, barium, copper, lithium, sodium, and iron; Y is a trivalent metal cation selected from the group consisting of aluminum, indium, gallium, iron, cobalt, nickel, chromium, boron, lanthanum, and cerium; A is an anion selected from the group consisting of $O_3$, $NO_3$, $SO_4$, Cl, OH, Cr, I, $SiO_3$, $HPO_3$, $MnO_4$, $HGaO_3$, $HVO_4$, $ClO_4$, and $BO_3$; b is determined by n and the valences of X and Y; c is 1, 2, or 3; m is 0 to 4; and n is 0.2 to 0.33.

Further, the pretreated hydrotalcite may be a layered double hydroxide including 30~80 wt % of magnesium oxide (MgO) and a residue of aluminum oxide ($Al_2O_3$), excluding moisture and anions.

Further, the pretreated hydrotalcite may include 50~80 wt % of magnesium oxide and a residue of aluminum oxide, excluding moisture and anions.

Further, the raw material may be obtained from: lipids derived from one or more selected from the group consisting of plants, animals, fish, macroalgae, and microalgae; recycled lipids from the food industry; or mixtures thereof.

Further, the raw material may be obtained from one or more selected from the group consisting of colza oil, rapeseed oil, palm oil, olive oil, sunflower oil, canola oil, bean oil, coconut oil, Jatropha oil, tall oil, lard, fish oil, milk fat, milk, micro algae, and macro algae.

Advantageous Effects

The method of producing hydrocarbons according to the present invention is advantageous in that hydrocarbons, which can be used as a fuel for producing power for transportation, can be produced without using hydrogen or a noble metal catalyst, thus reducing operation costs and equipment costs, compared to a conventional method of producing hydrocarbons using hydrogen and a noble metal catalyst.

BEST MODE

Figure 1:
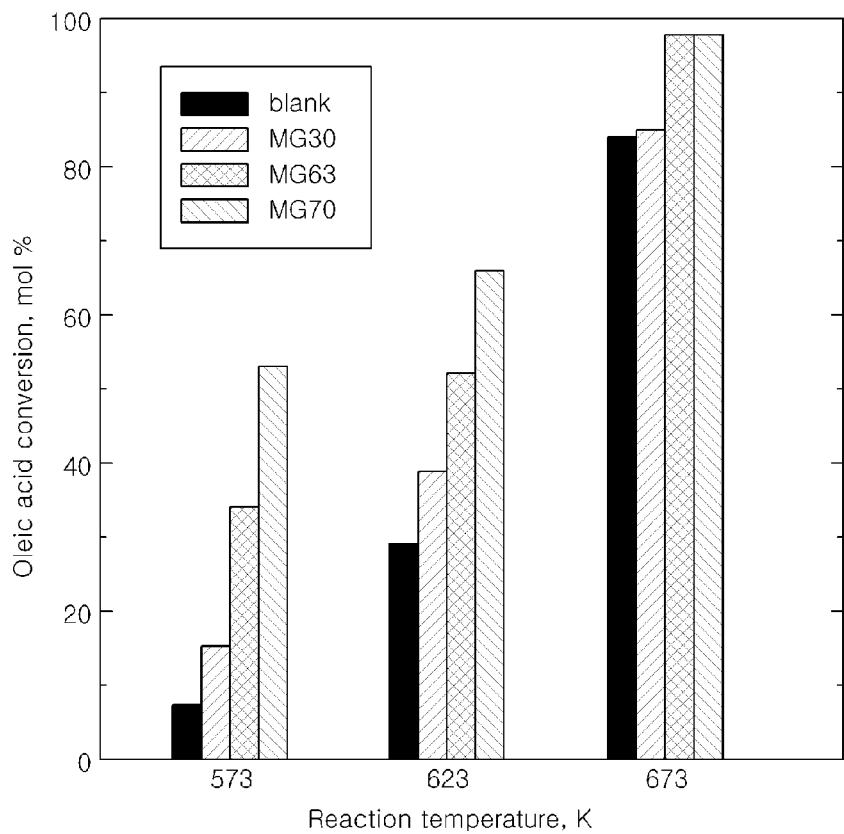
FIG. 1 is a graph showing the conversion ratio of oleic acid depending on reaction temperature and the kind of catalyst.

Hereinafter, the present invention will be described in detail.

First, the present invention is characterized in that oxygen is removed from a raw material without consuming hydrogen using hydrotalcite, which is cheaper than a conventional noble metal-supported catalyst, as a catalyst. That is, oxygen is removed from a raw material by bringing the raw material into contact with hydrotalcite as a catalyst to cause a decarboxylation or decarbonylation reaction, thus producing hydrocarbons suitable for making gasoline or diesel oil.

Here, the raw material is one or more selected from triglycerides, fatty acids, and derivatives of fatty acids, which are obtained from renewable raw material sources derived from biological organisms. That is, the raw material may be obtained from: lipids derived from one or more selected from the group consisting of plants, animals, fish, macro algae, and micro algae; recycled lipids from the food industry; or mixtures thereof. More concretely, the raw material may be obtained from one or more of colza oil, rapeseed oil, palm oil, olive oil, sunflower oil, canola oil, bean oil, coconut oil, Jatropha oil, tall oil, lard, fish oil, milk fat, milk, micro algae, and micro algae.

The decarboxylation reaction of the raw material is presented by Reaction Formula 1 below:

[Reaction Formula 1]

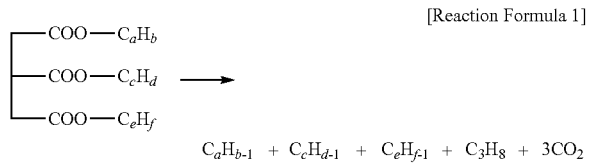

$$C_aH_{b-1} + C_cH_{d-1} + C_eH_{f-1} + C_3H_8 + 3CO_2$$

(Here, a, b, c, d, e, and f are natural numbers)

In the present invention, the reason why hydrotalcite is used as a catalyst for the decarboxylation reaction of the raw material is that the carboxyl group (—COO—) included in the raw material, such as a triglyceride, a fatty acid, and a fatty acid derivative, acts as an acid, and thus it can be selectively removed when it reacts with a basic solid material. That is, the reason for this is that the hydrotalcite has basicity, and provides a lot of active sites for providing basicity when the amount of the basic solid material increases. Further, since the carboxyl group (—COO—) included in the raw material, such as a triglyceride, a fatty acid, and a fatty acid derivative, can be removed in the form of carbon dioxide ($CO_2$), the decarboxylation reaction of the raw material can be accelerated by the $CO_2$ adsorption/desorption ability of the hydrotalcite.

[Reaction Formula 2]

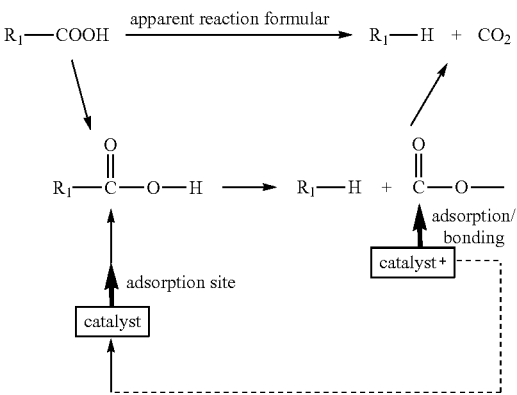

Therefore, in the present invention, the oxygen included in the raw material, that is, one or more selected from a triglyceride, a fatty acid, and a fatty acid derivative is removed in the form of carbon dioxide (COD or carbon monoxide (CO) using pretreated hydrotalcite, obtained by preheating hydrotalcite represented by Chemical Formula I below, and more preferably, hydrotalcite whose magnesium oxide (MgO) content is adjusted by pretreatment as a catalyst, thereby producing hydrocarbons. Here, the pretreatment is a process of removing moisture from hydrotalcite, and is not particularly limited as long as moisture can be removed from the hydrotalcite. For example, the pretreatment may be conducted by heating the hydrotalcite to a temperature of 100~600° C. while blowing argon, nitrogen, oxygen or air thereto.

In the present invention, the pretreated hydrotalcite, obtained by preheating hydrotalcite represented by the following Chemical Formula I, is used as a catalyst:

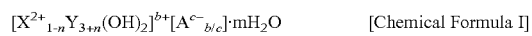 [Chemical Formula I]

wherein X is a monovalent or divalent metal cation selected from the group consisting of magnesium, calcium, zinc, manganese, nickel, cobalt, strontium, barium, copper, lithium, sodium, and iron; Y is a trivalent metal cation selected from the group consisting of aluminum, indium, gallium, iron, cobalt, nickel, chromium, boron, lanthanum, and cerium; A is an anion selected from the group consisting of $O_3$, $NO_3$, $SO_4$, Cl, OH, Cr, I, $SiO_3$, $HPO_3$, $MnO_4$, $HGaO_3$, $HVO_4$, $ClO_4$, and $BO_3$; b is determined by n and the valences of X and Y; c is 1, 2, or 3; m is 0 to 4, and is determined by heat treatment conditions, humidity and the like; and n is 0.2 to 0.33.

Since the composition of the pretreated hydrotalcite is the same as that of hydrotalcite represented by Chemical Formula I, except for whether or not moisture exists, those skilled in the art may change the composition of the hydrotalcite of the present invention by selecting the composition of the hydrotalcite represented by Chemical Formula I. For example, the pretreated hydrotalcite may include magnesium oxide and aluminum oxide, and may further include zinc oxide, copper oxide or the like in addition to magnesium oxide and aluminum oxide.

Preferably, the pretreated hydrotalcite is a layered double hydroxide including 30~80 wt % of magnesium oxide (MgO) and a residue of aluminum oxide ($Al_2O_3$), excluding moisture and anions. More preferably, the pretreated hydrotalcite may include 50~80 wt % of magnesium oxide and a residue of aluminum oxide, excluding moisture and anions. When the amount of the magnesium oxide is less than 30 wt %, there is a problem in that the catalytic activity of the hydrotalcite becomes low, and when the amount thereof is more than 80 wt %, there is a problem in that the catalytic stability of the hydrotalcite becomes low. Therefore, when the amount of magnesium oxide is 30~80 wt %, preferably 50 wt % or more, there is an advantage in that the catalytic activity of the hydrotalcite becomes high, and the catalytic stability of the hydrotalcite becomes high.

In the present invention, it is preferred that the contact of the raw material and a catalyst, that is, the decarboxylation or decarbonylation reaction of the raw material, be carried out at a temperature of 200~450° C. and a pressure of 0.1~15 MPa. When the reaction temperature is lower than 200° C., there is a problem in that the hydrotalcite participates in the reaction, so that, although the hydrotalcite adsorbs carbon dioxide (reaction intermediate) from a fatty acid or triglyceride, the carbon dioxide adsorbed on the hydrotalcite cannot be easily desorbed therefrom, with the result that the hydrotalcite cannot serve as a catalyst. When the reaction temperature is higher than 450° C. there is a problem in that a thermal decomposition reaction is superior to other reactions, so that a large amount of gaseous components is produced, with the result that the yield of liquid components is reduced and the catalytic stability of the hydrotalcite becomes poor. Further, when the reaction pressure is lower than 0.1 MPa, there is a problem in that a reaction product is vaporized at a high temperature, and when the reaction pressure is higher than 15 MPa, there is a problem in that operation costs and equipment costs are excessively increased. Moreover, since the decarboxylation or decarbonylation reaction of the raw material proceeds in a liquid phase, the reaction product thereof, that is, hydrocarbons, are also produced in a liquid phase. After the reaction is completed, the reaction product is filtered to remove a catalyst therefrom, thereby obtaining only hydrocarbons.

MODE FOR INVENTION

Hereinafter, the present invention will be described in more detail with reference to the following Examples.

Oleic acid was provided as a raw material, and hydrotalcite was provided as a catalyst. Here, as examples of the hydrotalcite excluding moisture and anions, MG30 (containing 30 wt % of MgO), MG63 (containing 63 wt % of MgO), and MG70 (containing 70 wt % of MgO) were provided, respectively.

EXAMPLE 1

MG30

After three high-pressure reactors were provided, 55.0 g of oleic acid and 2.75 g of MG30 (catalyst) were put into each of the high-pressure reactors, reacted at temperatures of 573 K, 623 K and 673 K (at standard pressure) for two hours, respectively, and then filtered to remove the catalyst, thereby obtaining only a liquid reaction product.

EXAMPLE 2

MG63

A liquid reaction product was obtained in the same manner as in Example 1, except that MG63 was used as a catalyst.

EXAMPLE 3

MG70

A liquid reaction product was obtained in the same manner as in Example 1, except that MG70 was used as a catalyst.

COMPARATIVE EXAMPLE 1

Blank

A liquid reaction product was obtained in the same manner as in Example 1, except that a catalyst was not used.

The characteristics of the liquid reaction products obtained from Examples 1 to 3 and Comparative Example 1 were evaluated using gas chromatography, elemental analysis, and Fourier transfer infrared spectroscopy (FT-IR).

First, the conversion ratios of oleic acid of Examples 1 to 3 and Comparative Example 1 were measured, and the results thereof are shown in FIG. 1. As shown in FIG. 1, it can be ascertained that most oleic acid was converted into different materials regardless of the kind of catalyst when the reaction temperature reached 673 K. Further, it can be ascertained that the conversion ratio of oleic acid was increased at the same reaction temperature as the amount of MgO was increased.

However, the conversion ratio of oleic acid is defined as the degree of oleic acid being converted into different materials. Therefore, although the conversion ratio of oleic acid is increased, it is insufficient to confirm whether or not hydrocarbons, which are target materials of the present invention, were produced due to the removal of oxygen included in the fatty acid.

Figure 2:
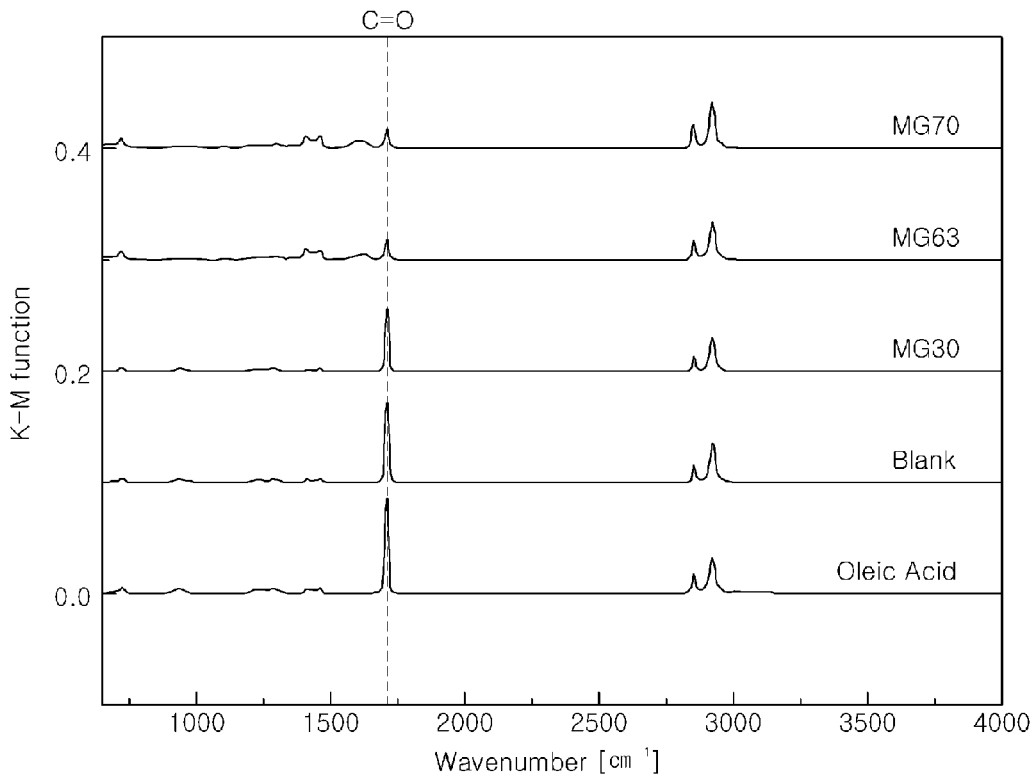
FIGS. 2 to 4 are graphs each showing Fourier transfer infrared (FT-IR) spectroscopy of a reaction product depending on reaction temperature and the kind of catalyst.
Figure 3:
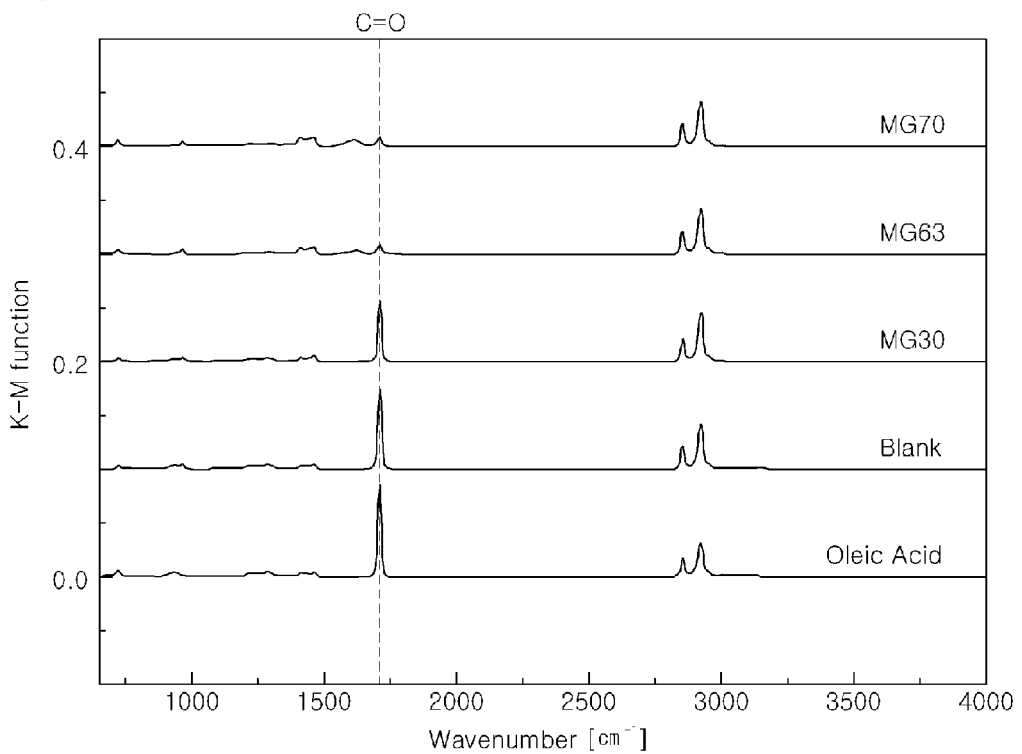
Figure 4:
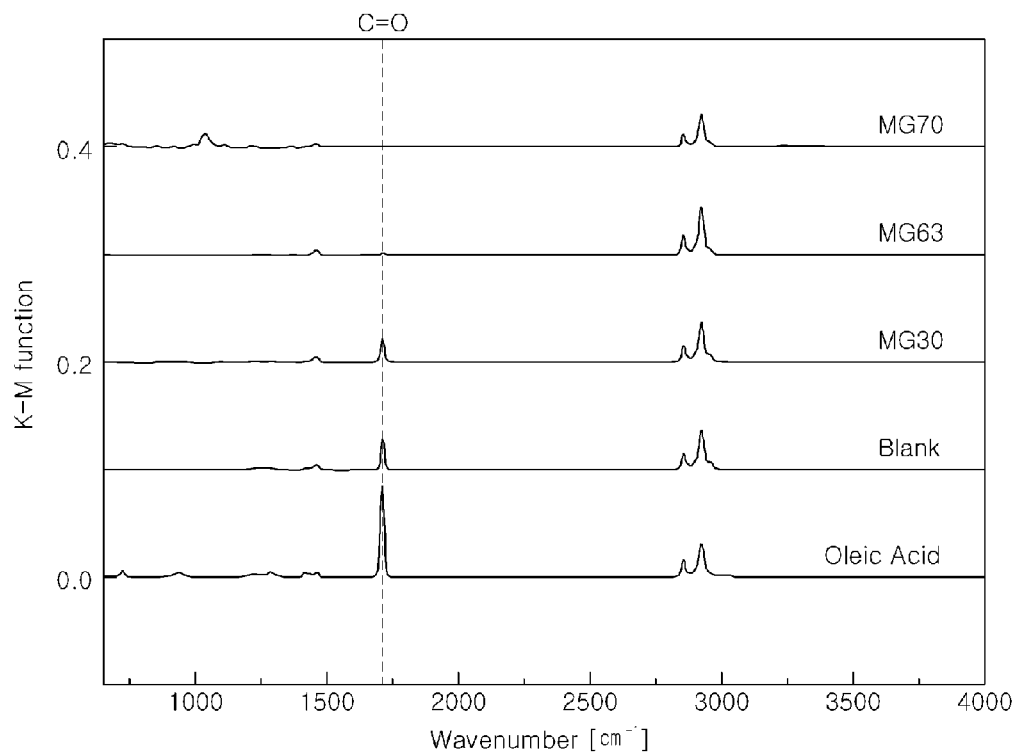

In order to confirm whether or not hydrocarbons were produced, the reaction products were analyzed using Fourier transfer infrared spectroscopy, and the results thereof are shown in FIGS. 2 to 4. As shown in FIGS. 2 to 4, it can be ascertained that the intensity of the peak corresponding to C=O indicating a carboxylic group (—COO—) on an infrared spectrum was decreased as the reaction temperature was increased and as the amount of MgO in the catalyst was increased at the same reaction temperature.

Therefore, it can be ascertained that the decarboxylation or decarbonylation reaction of fatty acid was accelerated when the hydrotalcite catalyst was used.

Figure 5:
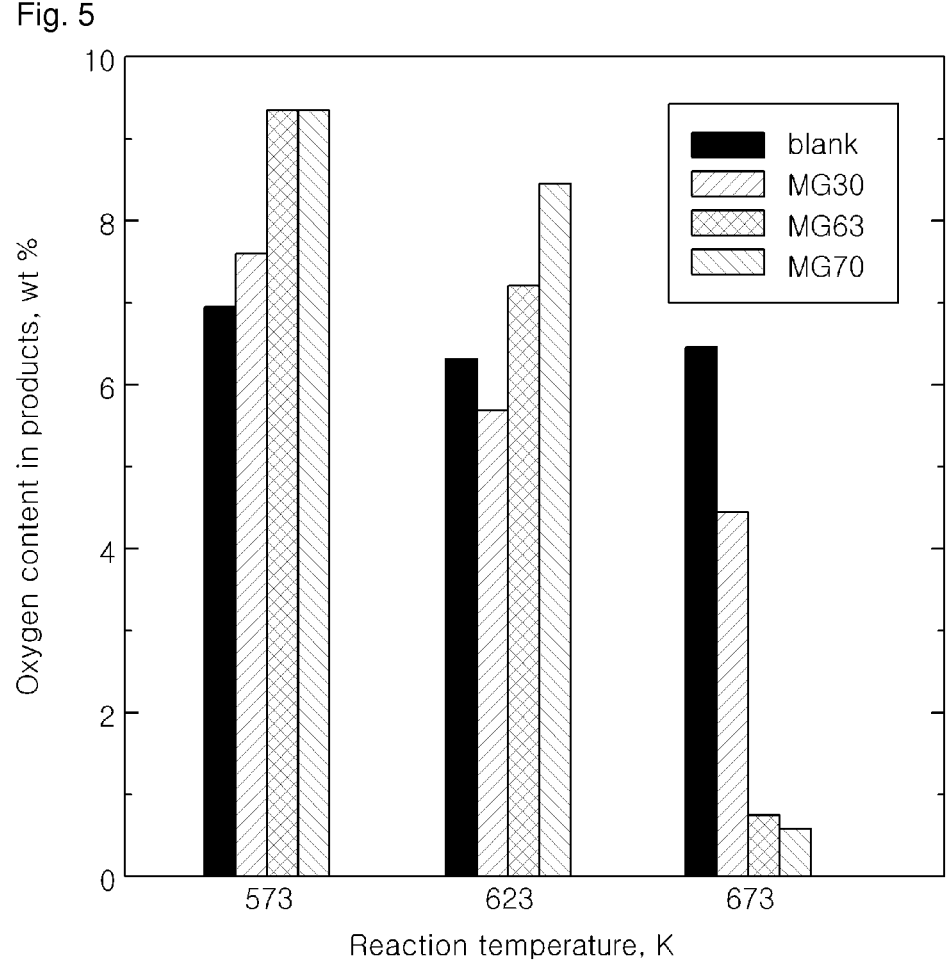
FIG. 5 is a graph showing the change of the oxygen content in a reaction product depending on reaction temperature and the kind of catalyst.

Finally, in order to confirm the formation of hydrocarbons including carbon and hydrogen as main components when hydrotalcite is used as a catalyst, the elements of the reaction product were analyzed. As a result, the concentrations of oxygen in the reaction products depending on the reaction temperature and the kind of catalyst are shown in FIG. 5. As shown in FIG. 5, it can be ascertained that, in the case of Examples 1 to 3 in which catalysts were used, the concentrations of oxygen were decreased, but in Comparative Example 1 in which a catalyst was not used, the concentration of oxygen was not greatly decreased from the initial value of wt %. Consequently, it can be ascertained that the concentration of oxygen was not greatly decreased at a reaction temperature of 623 K even though catalysts were used, and that hydrocarbons having an oxygen concentration of 0.7 wt % or less were produced only when the reaction temperature was increased to 673 K and MG63 and MG70 containing a large amount of MgO were used as catalysts.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of producing hydrocarbons using lipids derived from biological organisms and hydrotalcite, comprising the step of:
    pretreating hydrotalcite by heating the hydrotalcite to a temperature of 100-600° C. while blowing argon, nitrogen, oxygen or air to the hydrotalcite to remove moisture from the hydrotalcite, wherein the pretreated hydrotalcite is a double layered hydroxide including 50~80 wt % of magnesium oxide and a residue of aluminum oxide, excluding moisture and anions,
    bringing a raw material into contact with the pretreated hydrotalcite as a catalyst to remove oxygen from the raw material by a decarboxylation or decarbonylation reaction, wherein the step of bringing the raw material into contact with the catalyst is carried out at a temperature of 200~450° C. and a pressure of 0.1~15 MPa,
    wherein the raw material is one or more selected from triglycerides, fatty acids, and fatty acid derivatives, which are obtained from renewable raw material sources derived from biological organisms, and wherein the product produced by the method comprises hydrocarbons.

2. The method of claim 1, wherein the pretreated hydrotalcite is obtained by pretreating hydrotalcite represented by Chemical Formula I below:

$$[X^{2+}{}_{1-n}Y_{3+n}(OH)_2]^{b+}[A^{c-}{}_{b/c}]\cdot mH_2O \qquad \text{[Chemical Formula I]}$$

wherein X is a monovalent or divalent metal cation selected from the group consisting of magnesium, calcium, zinc, manganese, nickel, cobalt, strontium, barium, copper, lithium, sodium, and iron; Y is a trivalent metal cation selected from the group consisting of aluminum, indium, gallium, iron, cobalt, nickel, chromium, boron, lanthanum, and cerium; A is an anion selected from the group consisting of $O_3$, $NO_3$, $SO_4$, Cl, OH, Cr, I, $SiO_3$, $HPO_3$, $MnO_4$, $HGaO_3$, $HVO_4$, $ClO_4$, and $BO_3$; b is determined by n and the valences of X and Y; c is 1, 2, or 3; m is 0 to 4; and n is 0.2 to 0.33.

3. The method of claim 1, wherein the raw material is obtained from: lipids derived from one or more selected from the group consisting of plants, animals, fish, macroalgae, and microalgae; recycled lipids from the food industry; or mixtures thereof.

4. The method of claim 3, wherein the raw material is obtained from one or more selected from the group consisting of colza oil, rapeseed oil, palm oil, olive oil, sunflower oil, canola oil, bean oil, coconut oil, Jatropha oil, tall oil, lard, fish oil, milk fat, milk, microalgae, and macro algae.

* * * * *